United States Patent
Sherman et al.

(10) Patent No.: US 7,346,026 B2
(45) Date of Patent: Mar. 18, 2008

(54) 4X DESIGN FOR WIRELESS LOCAL AREA NETWORK THROUGHPUT ENHANCEMENT

(75) Inventors: Itay Sherman, Tel Aviv (IL); Lior Ophir, Herzeliya (IL); Igor Royzis, Kfar Yona (IL); Fredy Rabih, Tel Aviv (IL)

(73) Assignee: Texas Instruments Incorporated, Dallas, TX (US)

( * ) Notice: Subject to any disclaimer, the term of this patent is extended or adjusted under 35 U.S.C. 154(b) by 877 days.

(21) Appl. No.: 10/760,535

(22) Filed: Jan. 21, 2004

(65) Prior Publication Data

US 2005/0021864 A1  Jan. 27, 2005

Related U.S. Application Data

(60) Provisional application No. 60/441,544, filed on Jan. 21, 2003.

(51) Int. Cl.
*H04Q 7/00* (2006.01)

(52) U.S. Cl. .................. 370/328; 370/338; 370/473

(58) Field of Classification Search ............. 370/394, 370/328, 338, 473; 455/410
See application file for complete search history.

(56) References Cited

U.S. PATENT DOCUMENTS

| | | | |
|---|---|---|---|
| 6,791,962 B2 * | 9/2004 | Wentink | 370/338 |
| 7,099,654 B1 * | 8/2006 | Tewfik | 455/410 |
| 7,149,197 B2 * | 12/2006 | Garahi et al. | 370/328 |
| 2005/0030976 A1 * | 2/2005 | Wentink | 370/473 |

* cited by examiner

*Primary Examiner*—Chi Pham
*Assistant Examiner*—Albert T. Chou
(74) *Attorney, Agent, or Firm*—W. James Brady, III; Frederick J. Telecky, Jr.

(57) ABSTRACT

A system and method for wireless local area network throughput enhancement includes an access point and an endpoint station in a wireless computer network transmitting data packets over radio frequency signals, and reordering the data packets into a megapacket in the access point using concatenation of the data packets. The method provides a significant throughput enhancement on wireless networks including IEEE 802.11 networks.

13 Claims, 17 Drawing Sheets

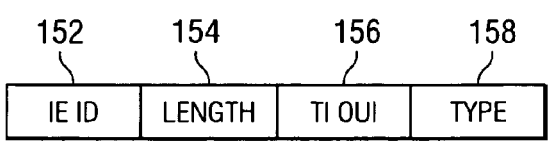
*FIG. 2A*
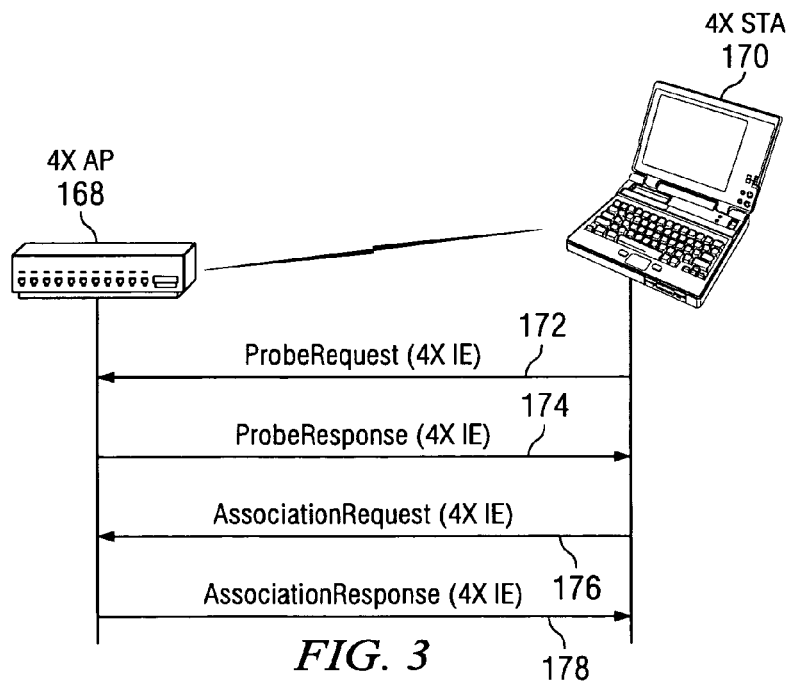

4X DESIGN FOR WIRELESS LOCAL AREA NETWORK THROUGHPUT ENHANCEMENT

CROSS-REFERENCE TO RELATED APPLICATIONS

This application claims priority to U.S. Application Ser. No. 60/441,544 filed on Jan. 21, 2003.

FIELD OF THE INVENTION

The present invention relates generally to features for a wireless local area network (WLAN) that increase the wireless link reliability and boost throughput. More specifically, the preferred embodiment relates to boosting throughput of an IEEE 802.11 wireless local area network.

BACKGROUND OF THE INVENTION

WLANs utilize RF signals or light signals to connect mobile devices to each other or to a centralized gateway and transmit data between the physical devices. In 1997 the IEEE published standards for WLANs under the title of 802.11. The 802.11 standards contain different protocols that may use unlicenced 2.4 GHz and 5 GHz radio bands to transmit packet data. IEEE 802.11 enables mobile stations (e.g., endpoints) to communicate through a wireless network interface card directly with each other or with other stations through an access point. An access point (AP) is a centralized gateway providing message and power management and access to an external LAN and/or the Internet. IEEE 802.11 access products are sold with personal computers (e.g., wireless NICs), computer peripherals, print servers, and mobile devices such as laptops and personal digital assistants (PDAs).

There are a plurality of 802.11 standards that each use different frequency bands and have varying data transmission speeds. The original IEEE 802.11 standard supported wireless interfaces operating at speeds of up to 2 megabyte per second (Mbps) in the 2.4 GHz radio band. By using different modulation techniques, IEEE 802.11b raised the data transmission rates to 11 Mbps, while 802.11a supports up to 54 Mbps transmission rates at a 5 GHz frequency. The IEEE 802.11g is developing standards for data transmission rates of 54 Mbps at the 2.4 GHz frequency.

WLANs under 802.11 use media access control (MAC) protocols to transmit between wired and wireless devices. Each wireless network card is assigned a MAC address used to identify the station. The basic protocol of an IEEE 802.11 network is the Basic Service Set (BSS), which is merely a number of endpoint stations that communicate with one another. The access to wireless networks is controlled by coordination functions. The distributed coordination function (DCF) provides access similar to Ethernet CSMA/CA access. The DCF determines if the RF link between devices is clear prior to transmitting. Stations use a random backoff after every frame to avoid collisions. Endpoint stations provide MAC Service Data Units (MSDUs) after detecting no current transmissions. The MSDUs functions to transmit data frames to the proper endpoint station.

Under the DCF access method of 802.11, each MSDU transmission incurs an overhead that includes a distributed interface space (DIFS) duration, a backoff interval, a Physical Layer Convergence Procedure (PLCP) preamble, a PLCP header, a MAC header, a SIFS duration,a dn an acknowledgment (ACK) time (which comprises a PLCP preamble, a PLCP header, and the ACK MPDU). Such an overhead amounts up to 764.2 μs on an 802.11b PHY with long PLCP preamble an 11 Mbps data rate.

SUMMARY

The 4x framework of the preferred embodiment includes multiple algorithms that provide a significant throughput enhancement to 802.11 devices. Each one of these algorithms can be used by itself or in combination with one another. Usage of large packets improves the efficiency of 802.11 networks. The 4x framework uses large packets (e.g., Mega Packets) that are compliant to the 802.11 b/g/a PHY specification (up to 4095 bytes). These packets are also using 802.11 MAC compliant headers, but their payload is proprietary. These packets should be recognized by standard 802.11 equipment, that will defer from transmission according the packets length. Standard equipment will not be able to extract the MPDU content as it is using a proprietary encapsulation, but this is not an issue, since these packets will only be used between two STA/APs that support 4x features of the preferred embodiment.

In order to create Mega packets, the 4x framework uses two different techniques, Extended MTU and Concatenation. Extended MTU is a technique that is used in cases where both the source and target as well as all the route between them are on the WLAN network. Ad-Hoc mode is one example. The source TCP/IP max MTU is simply modified to match the size of the 802.11 Mega Packet.

Concatenation is a technique that is used in cases where either the source, destination or any point on the route between them is not on the WLAN (Infrastructure mode as an example). In this case the data source concatenates multiple MPDUs in to one 802.11 packet. The implementation on a STA is identical with the exception that the link list used to hold the buffered packets is a single linked list (all packets from an STA in Infrastructure mode are destined to the AP, so there is no need for multiple queues according to destination).

Various features are implemented by the preferred embodiment to implement 4x concatenation. The concatenation process reduces delay and does not add delay to the system. Packets are being concatenated only if natural congestion is occurring in the AP or STA. This ensures that no packet will be delayed more then it would have been without 4x. In most cases the delay will be reduced as multiple MPDUs are being transmitted on a single access opportunity to the channel.

Further, in order to maximize the throughput and use the largest packets possible, the source MTU is modified. For example: for a maximum Mega Packet size of 4095 bytes, the source MTU is modified to approximately 1300 bytes to allow for 3 concatenated MPDUs in a single Mega packet. Leaving the MTU in it's standard value for Ethernet (1500 bytes) would yield packets of maximum size of approximately 3000 bytes only).

The 4x framework includes a mechanism to reorder packets in the AP in order to make sure that the 4x STA will enjoy the throughput enhancements offered by the usage of Mega Packets also in a mixed environment that includes non 4x STAs so that bandwidth sharing is controlled.

Acknowledgment (ACK) Emulation is also performed by the preferred embodiment. TCP/IP protocol involves the sending of ACK packets from a connection destination to the source. The ACK emulation algorithm can eliminate the need to send most of these TCP/IP packets. This is achieved by compressing the information conveyed in the TCP/IP packets and appending it to the 802.11 ACK packets. The receiver of these 802.11 ACK packets will extract the information and will recreate the TCP/IP ACK packets that where eliminated. The implementation presented maintains the structure of the 802.11 ACK packets and uses reserved bits in 802.11 PLCP headers to convey the TCP/IP ACK information. This implementation is fully interoperable with existing 802.11 equipment.

The 802.11 protocol uses a random back off algorithm to reduce collisions. The Zero collision method implemented in the preferred embodiment enables a WLAN to achieve a collision free implementation by usage of different Contention Window (CW) values for different ST/IAP in a BSS.

BRIEF DESCRIPTION OF THE DRAWINGS

Preferred embodiments of the invention are discussed hereinafter in reference to the drawings, in which:

FIGS. 2A-2C illustrate protocols of the preferred embodiment;

FIG. 3 illustrates an access point and station;

DETAILED DESCRIPTION OF PREFERRED EMBODIMENTS

The preferred embodiment of the present invention comprises a set of features for an IEEE 802.11 wireless local area network (WLAN), called "4X" that will increase the wireless link reliability and boost the throughput of WLAN BSS and Infrastructure (IBSS) nodes supporting 4X. The preferred embodiment is applied to both IBSS and Ad-Hoc. The 4X features comprise 4X protocol, 4X concatenation, and 4X ACK Emulation techniques.

Figure 1:
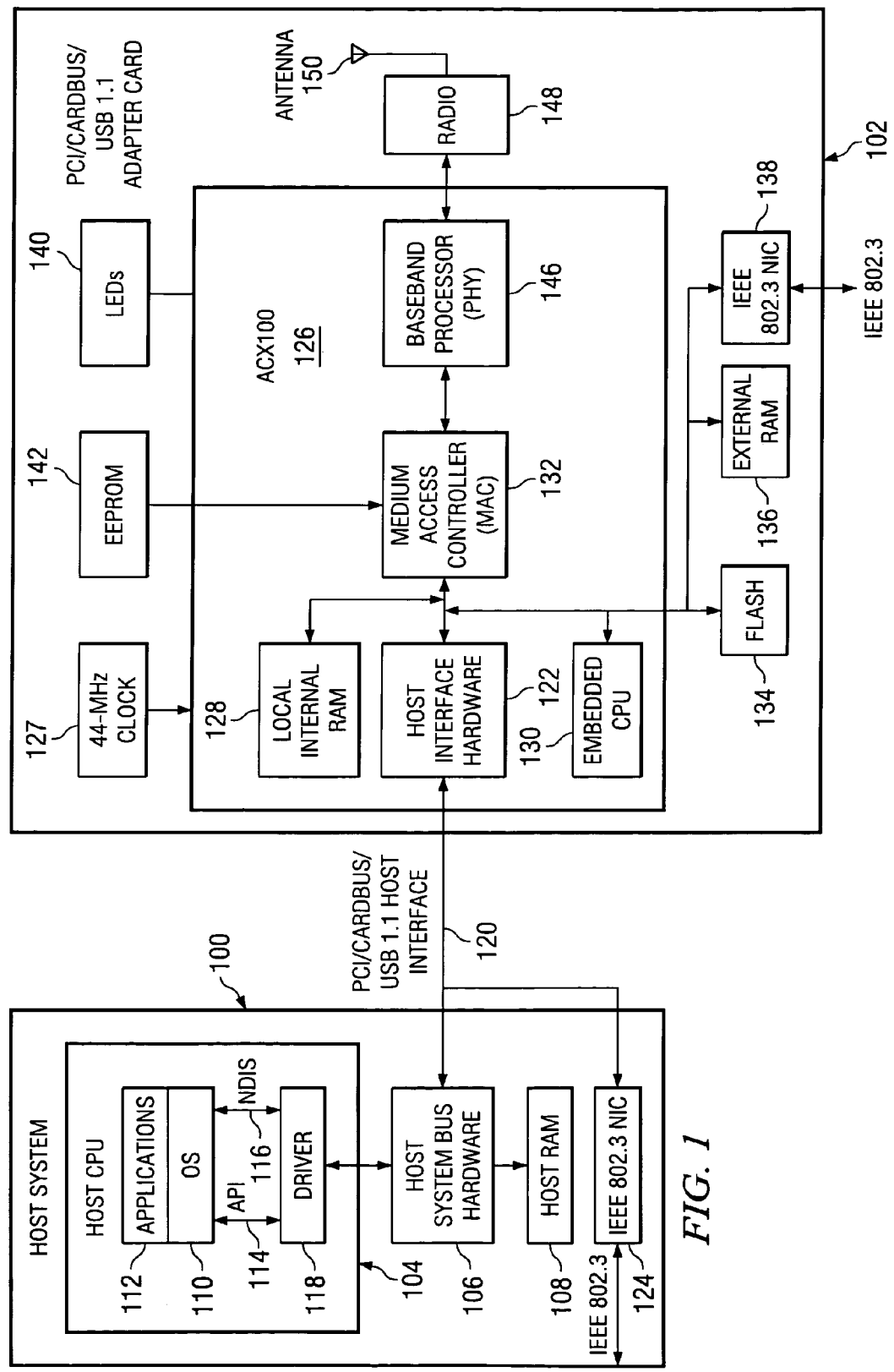
FIG. 1 illustrates hardware architecture of the preferred embodiment.

Referring to FIG. 1, an exemplary embodiment of the present invention may be implemented using a host system 100 connected to a wireless PCI/Cardbus/USB adapter card 102. The host system 100 comprises a host central processing unit (CPU) 104 host system bus hardware 106, and host random access memory (RAM) 108. The CPU 104 includes an operating system 110 and possibly software applications 112. The CPU 104 interfaces with system bus hardware 106 through driver 118. Driver 118 interfaces with the CPU's OS 110 through Application Program Interface (API) 114 and a Network Driver Interface Specification (NDIS) 116.

Host system bus 106 connects to adapter card 102 through host interface 120 and PCI/Cardbus/USB host interface hardware 122, located on a Texas Instruments ACX 100 wireless network chip 126 in adapter card 102. Network chip 126 is timed with a 44-Mhz clock 127 and is connected to light emitting diodes 140. Host interface 120 may also connect to an IEEE 802.3 network interface card 124 and an IEEE 802.3 network connection in host system 100. ACX100 126 also includes a local internal RAM 128, embedded CPU130 that are connected to MAC controller through a local bus. Adapter card 102 may also comprise flash RAM 134, external RAM 136, and an IEEE 802.3 network interface card 138 connected to ACX100 126 components through the local bus. MAC 132 is connected to Extended Erasable Programmable Read Only Memory (EEPROM) 142 and baseband processor physical layer (PHY). A radio 148 is connected to PHY 146 and MAC 132 on ACX100 chip 126. Radio 148 transmits and receives radio frequency signals through antenna 150 on adapter card 102.

The preferred embodiment uses a "4x framework" that includes multiple algorithms that provide a significant throughput enhancement to 802.11 devices. Each one of these algorithms can be used individually or in combination. The exemplary embodiment uses algorithms that create large, or Mega, packets for transmission in an 802.11 network. Usage of Mega packets improves the efficiency of 802.11 networks. The 4x framework uses Mega packets that are compliant to the 802.11b/g/a PHY specification (up to 4095 bytes). These large packets are also using 802.11 MAC compliant headers, but the payloads on the large packets is proprietary. These packets should be recognized by standard 802.11 equipment, that will defer from transmission according the packets length. Standard equipment will not be able to extract the MPDU content as it is using a proprietary encapsulation. However, extracting the MDPU content is not required to practice the exemplary embodiment since the Mega packets will be used between two station (STA) and Access Points (AP), or STA/AP, that support 4x.

In order to create Mega packets, the 4x framework of the exemplary embodiment uses two different techniques. The first technique is an Extended MTU which is used in cases where both the source and target as well as all the route between them, are on the WLAN network. An implementation of this technique is the Ad-Hoc mode, discussed later. The source TCP/IP max MTU is simply modified to match the size of the 802.11 Mega Packet.

The second method is a concatenation technique. Concatenation is used in cases where either the source, destination or any point on the route between them is not on the WLAN (Infrastructure mode as an example). In the preferred embodiment, the data source concatenates multiple MPDUs in to one 802.11 packet. The implementation on a STA is identical with the exception that the link list used to hold the buffered packets is a single linked list (all packets from an STA in Infrastructure mode are destined to the AP, so there is no need for multiple queues according to destination). The concatenation process of multiple MPDUs provides reduced delay of data transmission and does not add delay to the system. Packets are being concatenated only if natural congestion is occurring in the AP or STA. This ensures that no packet will be delayed more then it would have been without using the 4x embodiment. In most cases, the delay will be reduced as multiple MPDUs are being transmitted on a single access opportunity to the channel.

In order to maximize the throughput and use the largest packets possible, the source MTU is modified and optimizes. For example, for a maximum Mega packet size of 4095 bytes, the source MTU is modified to approximately 1300 bytes to allow for 3 concatenated MPDUs in a single Mega packet. In comparison, leaving the MTU in it's standard value for Ethernet (e.g., 1500 bytes) would yield packets of maximum size of approximate 3000 bytes.

The exemplary embodiment also includes controlled bandwidth sharing. The 4x framework includes a mechanism to reorder packets in the AP in order to make sure that the 4x STA will enjoy the throughput enhancements offered by the usage of Mega Packets also in a mixed environment that includes non 4x STAs.

In the 4x framework of the exemplary embodiment, the activation of 4x features is performed by the association mechanism. A 4x STA transmits a 4x Information Element (IE) in association request and activates 4x features upon the reception of this IE in the association response. The 4x information element is transported in the 802.11 Robust Security Network (RSN) Information Element. FIG. 2B illustrates the format of the RSN information element that contains the 4x information. The format includes IE identification (ID) 152, length 154, TI OUI 156 (a 3-octet field that identifies this information element as a 4x information element), and Type 158 (a 1-octet field that contains the protocol version and the supported feature set designator). If a 4x AP supports RSN, then two RSN information elements will be present in the frame. One RSN information element will contain the normal RSN configuration information, and the other RSN Information element will contain the 4x information.

FIG. 2B illustrates a table showing Field 160 of the RSN information element of FIG. 2A and a Value 162 for each Field 160. The field in the RSN IE that contain the information that advertises the 4x capable WLAN BSS node are the TI OUI field and the Type field. FIG. 2C illustrates a table supporting the Type field of the RSN IE. The Type field contains the protocol version 164 and the supported feature set designator 166.

FIG. 3 illustrates an 4X compatible AP 168 and a 4X compatible STA 170 that are wirelessly linked together. To advertise the 4X capabilities in Infrastructure and IBSS modes, frame sequences are exchanged as shown. STA 170 sends AP 168 a Probe Request 172 containing a 4X IE. AP 168 then sends STA 170 a Probe Request 174. STA 170 then sends AP 168 an Association Request 176. In response, AP 168 transmits an Association Request 178 to STA 170. All Probe requests and Association requests contain 4X IEs.

In IBSS mode, 4X capability can be enabled in a High Speed Ad-Hoc mode only. Reload of the 4X driver is required in order to change the status from Enabled to Disabled, and vice-versa. In Infrastructure mode, the 4X protocol only supports the global activation or deactivation of the WLAN individually. The decision to change the 4X activity status is taken by every node of a WLAN individually. All of the 4X functions should be a part of a Rate management algorithm. Thus, the Rate management algorithm drives the decision to enable or disable 4X protocols. Further, in Infrastructure mode, 4X is disabled for the transmit path only.

When working in Ad-Hoc mode, the exemplary embodiment may create a simpler variant of the exemplary concatenation algorithm. The exemplary 4x protocols are implemented for both Infrastructure and Ad-Hoc modes of operation. When working in Ad-Hoc mode it is possible to create a simpler variant of the preferred concatenation algorithm. In Ad-Hoc mode two or more adapter cards 102 are communicating between one another. In this mode of operation, all packets received by the driver are received from other WLAN stations. Since the IP protocol is not limited to sending packets of Ethernet size, larger packets may be transmitted directly from one 4X-supported STA to anther 4X-supported station on a WLAN. In this case the need to concatenate packets is bypassed in the driver level and a Host OS 110 IP stack is instructed to provide larger IP packets.

For example, this exemplary embodiment may be implemented on a Microsoft Windows-based OS 110 and executed in the following manner. The driver is implemented as NDIS driver. When the driver is implemented it reports to the IP stack the maximum MTU size it can support. If the driver is configured to work in Ad-Hoc mode, then it will report a larger size of MTU (as an example 4000 bytes). The IP stack will then perform the segmentation of data from any connected applications to TCP/IP blocks of 4 Kbyte size. The IP stack, as part of it's TCP/IP session establishment, will also communicate with the session target to probe it's maximum MTU size. If this value is lower than a pre-set MTU, then the lower value will be used. This ensures that the larger packets will only be used when both sides of the session can support larger packets.

Figure 4A:
FIGS. 4A-4C illustrate MSDU formats.
Figure 4B:
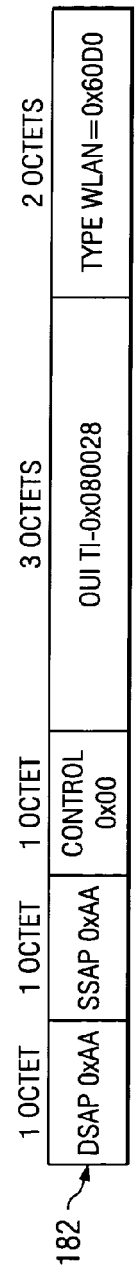
Figure 4C:
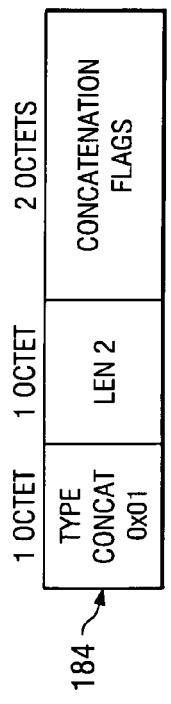

The 4X concatenation method of the preferred embodiment is used to send multiple MSDUs for the same destination by encapsulating those MSDUs into a single Mega Packet DU (MPDU). For the exemplary embodiment to function properly, the 802.11 frame fragmentation feature should be turned off. The 4X concatenationn is applicable only to unicast data but not to broadcast or multicast queues. The diagram in FIG. 4A illustrates the concatenated MPDU format 180. The format includes an 802.11 header of 24 Octets, a TI SNAP of 8 Octets, a concatenation 4X header of 4 Octets, a concatenated MSDU of n Octets which continues until a final frame of concatenated MSDUs. FIG. 4B illustrates the format 182 of the TI SNAP frame from FIG. 4A. FIG. 4C further illustrates the format 184 of the concatenation 4X header frame of FIG. 4A.

Figure 5A:
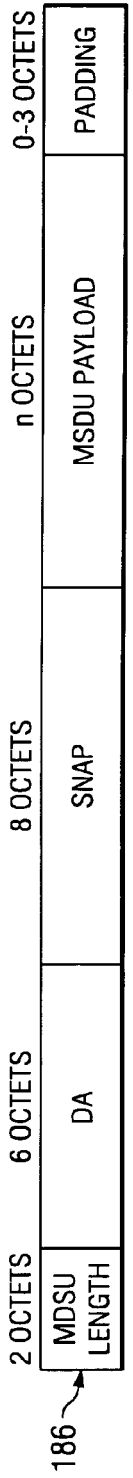
FIGS. 5A-5C illustrate MSDU formats.
Figure 5B:
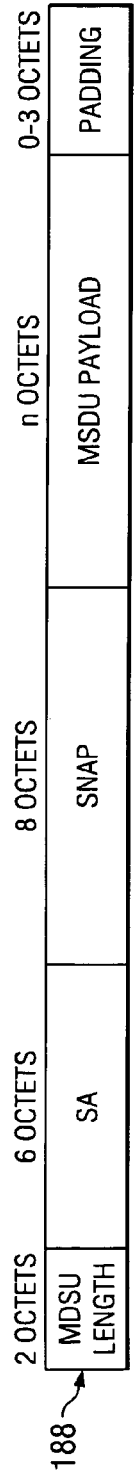
Figure 5C:
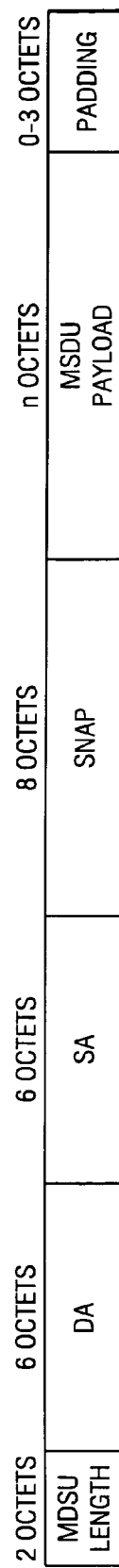

FIGS. 5A-5C illustrate the concatenated MSDU formats for exemplary embodiments. FIG. 5A illustrates a received concatenated MSDU format 186, FIG. 5B illustrates a transmitted concatenated MSDU format 188, and FIG. 5C illustrates an AP-to-AP MSDU format 190. In the numbered fields of the formats, Field One: "MSDU length" refers to the length of the MSDU in bytes (not including the length of the "MSDU Length" field itself), Field Two: DA represents the MSDU's transmission address and SA represents the MSDU's source address, Field Three: SNAP represents the MSDU's SNAP header, Field Four: Payload represents the data portion of the MSDU, and Field Five: Padding represents zero bytes for MSDU alignment. The size of each payload must be a multiple of 32 bits. If the size of a payload is not a multiple of 32 bits, then that payload must be padded in the Padding field with NULL bytes until the payload size is a multiple of 32 bits.

If Inter-AP communication is required, then the following rules are used to build the concatenated MPDU. In the 802.11 MAC header, Header control field the ToDS=1 and FromDS=1; the Address 1 field is equal to Address2 field and holds the RA of the target AP; the Address2 field is equal to Address4 field and holds the TA of the source AP. For the concatenation header, bit 2 is the AP2AP bit and is Set. For the concatenated MSDU, the format is the same as FIG. 5C and the SA field contents are equal to the MAC address of the STA that generated the packet, and the DA field contents are equal to MAC address of the STA that the packet is targeted for.

Regarding the management of concatenation, the exemplary embodiment provides the capability to disable concatenation. The inactive state of concatenation applies to the transmit path only. Concatenation is enabled or disabled on a per STA basis, based on the 4X management algorithm decision. When concatenation is enabled, both Transmit and Receive paths perform it. When concatenation is disabled, the transmit path stops to concatenate the data packets into 4X concatenated MPDUs. However, the receive path continues to accept 4X concatenated MPDUs and de-concatenate them into data packets.

Figure 6:
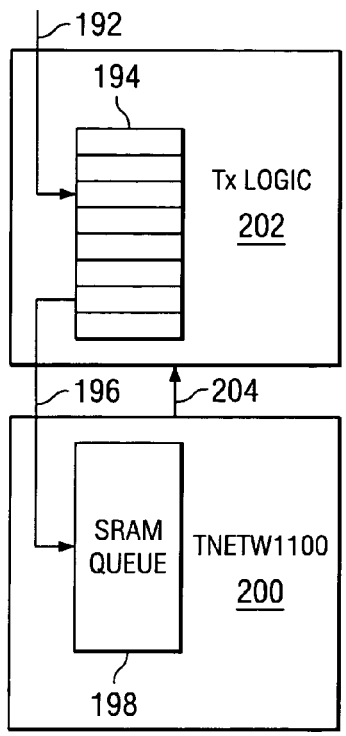
FIG. 6 illustrates concatenation transmission queues

Referring to FIG. 6, three phases of the concatenation process are illustrated. In Phase 1, the MSDU is inserted 192 into the transmission Waiting Queue 194. In Phase 2, the concatenation logic tries to concatenate 196 several MSDU into one MPDU. If there is a single MSDU in the waiting queue it will be moved in its present form to the TNETW1100 transmission queue 198. The concatenation may be done together with moving frames from Transmission Waiting Queue 194 to TNETW1100 200. If the SRAM/TNETW1100 queue 198 is full, the MSDU remains in the waiting queue. The TNETW1100 transmission queue 198 may contain no more than two MPDUs. If the queue is empty, the transmission logic 202 exits. In Phase 3 (196) upon receiving a "Transmission Complete" interrupt, the transmission logic 202 commits Phase 2 that will cause Phase 3 and Phase 2 again until no further MSDUs will remain in the Waiting Queue 194.

Figure 7A:
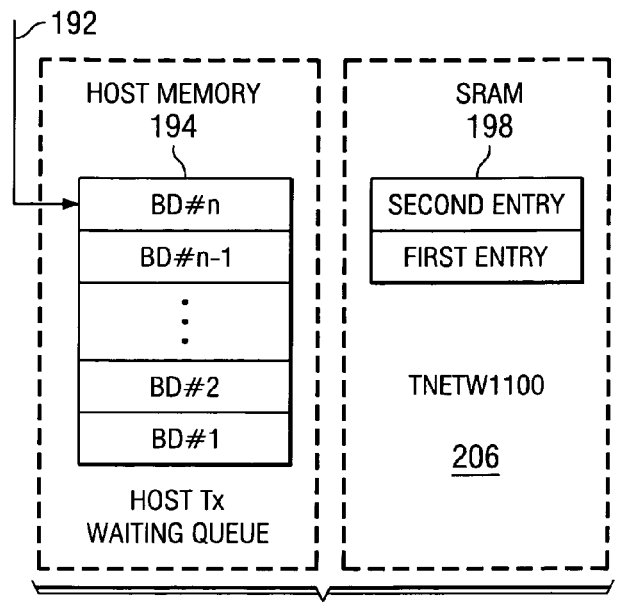
FIGS. 7A-7C illustrate concatenation transmission queues.
Figure 7B:
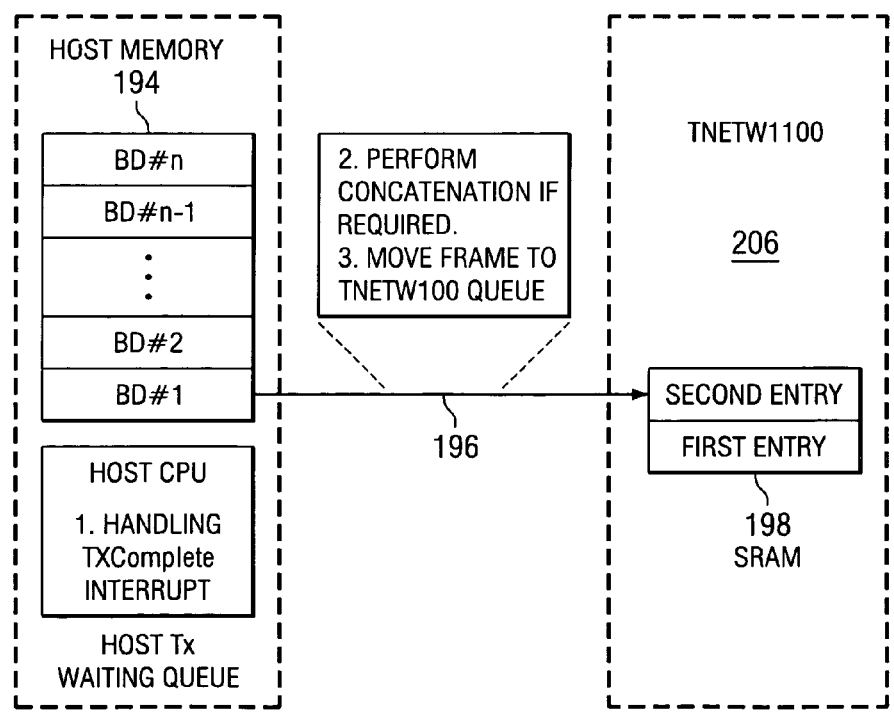
Figure 7C:
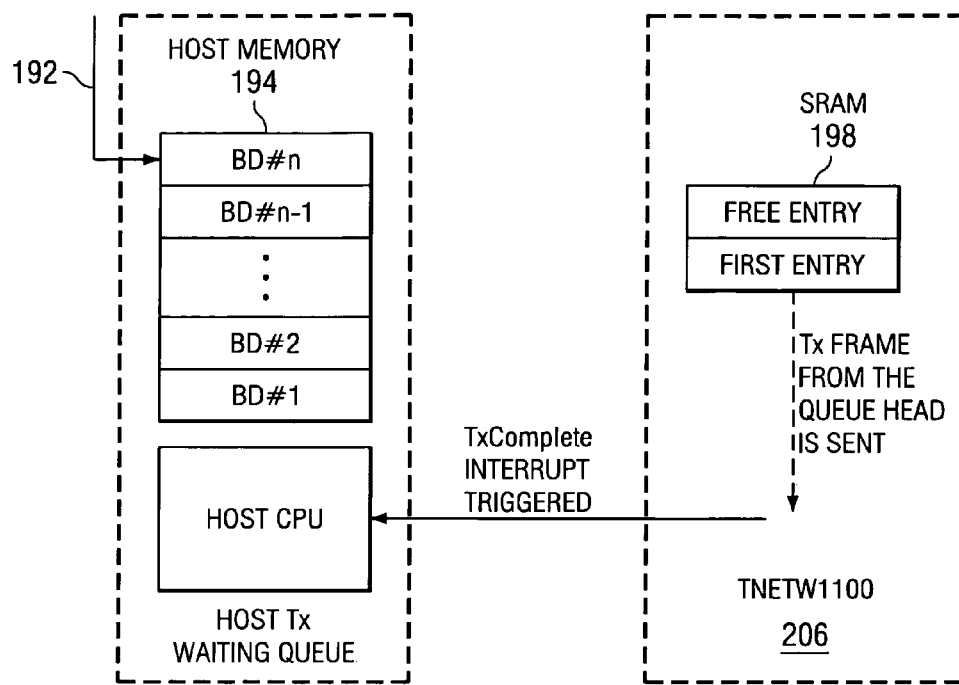

FIGS. 7A, 7B, and 7C further illustrated the concatenation process of FIG. 6 with functional diagrams of Host Transmission Waiting Queue 194 in Host Memory 204 and TNETW1100 Transmission Queue 198 in SRAM 206. In each Figure, Waiting Queue 194 is illustrated as a stack of Buffer Descriptors BD#1 through BD#n. SRAM Queue 198 is illustrated with a stack of 1st entry, 2nd entry, and Free Entry frames. As described previously, in Phase 1, the MSDU is inserted 192 into the transmission Waiting Queue 194 as BD#n, shown in FIG. 7A. FIG. 7B shows that in Phase 2, the concatenation logic tries to concatenate 196 several MSDU into one MPDU. If there is a single MSDU in the waiting queue it will be moved in its present form to the TNETW1100 transmission queue 198. The concatenation may be done together with moving frames from Transmission Waiting Queue 194 to TNETW1100 Queue 198. If the TNETW1100 queue 198 is full, the MSDU remains in the waiting queue 194. The TNETW1100 transmission queue 198 may contain no more than two MPDUs. If the queue is empty, the transmission logic 202 exits. FIG. 7C illustrates that in Phase 3, upon receiving a "Transmission Complete" interrupt, the transmission logic 202 commits Phase 2 that will cause Phase 3 and Phase 2 again until no further MSDUs will remain in the Waiting Queue 194. A Transmission frame from Queue 198 is sent from eh queue head to the Host CPU 104.

Figure 8:
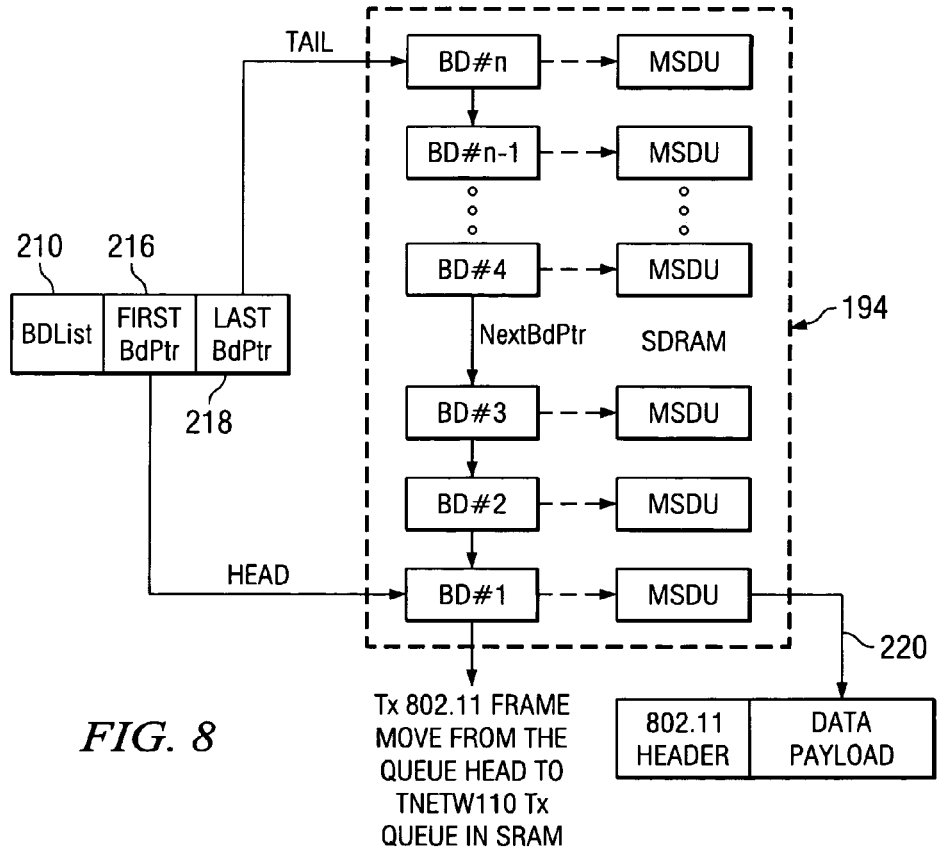
FIG. 8 illustrates a concatenation transmission queue.

FIG. 8 illustrates an exemplary embodiment of the structure of the buffer descriptor queue, for example the Host Transmission Waiting Queue 194. The "BD" designation represents queue buffer descriptor 210. Each BD includes at least the following fields. 1: Status that indicates whether BD is full or empty and several error flags; 2: Buffer length which is the pointed buffer (MSDU) length; 3: Buffer pointer which is the point to the MSDU; 4: Next BD pointer 214 which is the next buffer descriptor in the transmission queue. The BdList is a structure holding a first BD pointer 216 the head and a Last BD pointer 218 to the tail of BD's queue. These pointers are always updated upon new packet insertion at the tail of the queue 194 and upon moving a packet from the queue head 194 to the TNETW1100 transmission queue 198. The new incoming packet is always added to the tail of the queue 194. If the TNETW1100 queue 198 has free entries, then one or more packets are moved 220 from the head of the transmission waiting queue 194 to TNETW1100 queue 198.

Figure 9A:
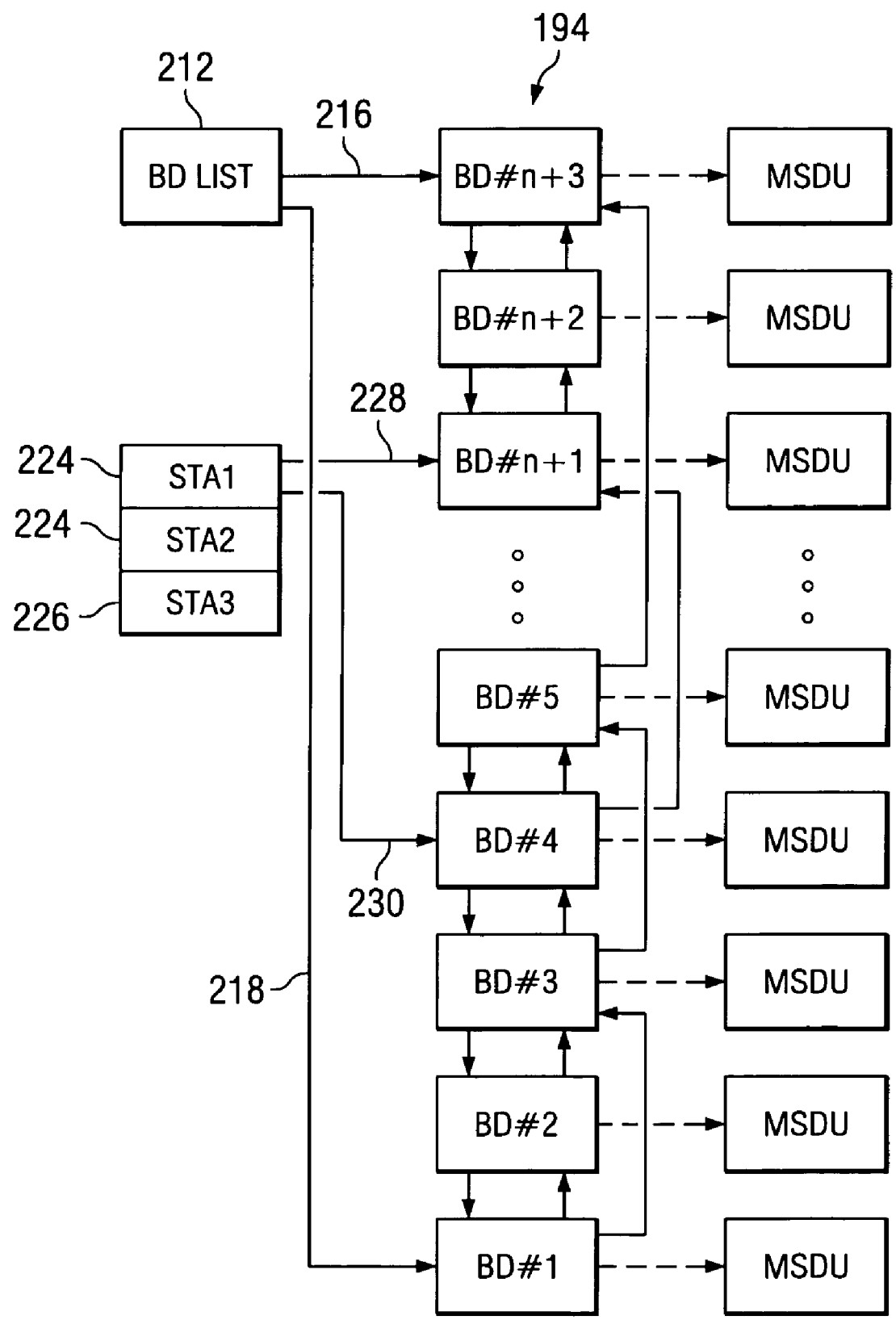
FIGS. 9A-9C illustrate concatenation transmission queues.
Figure 9B:
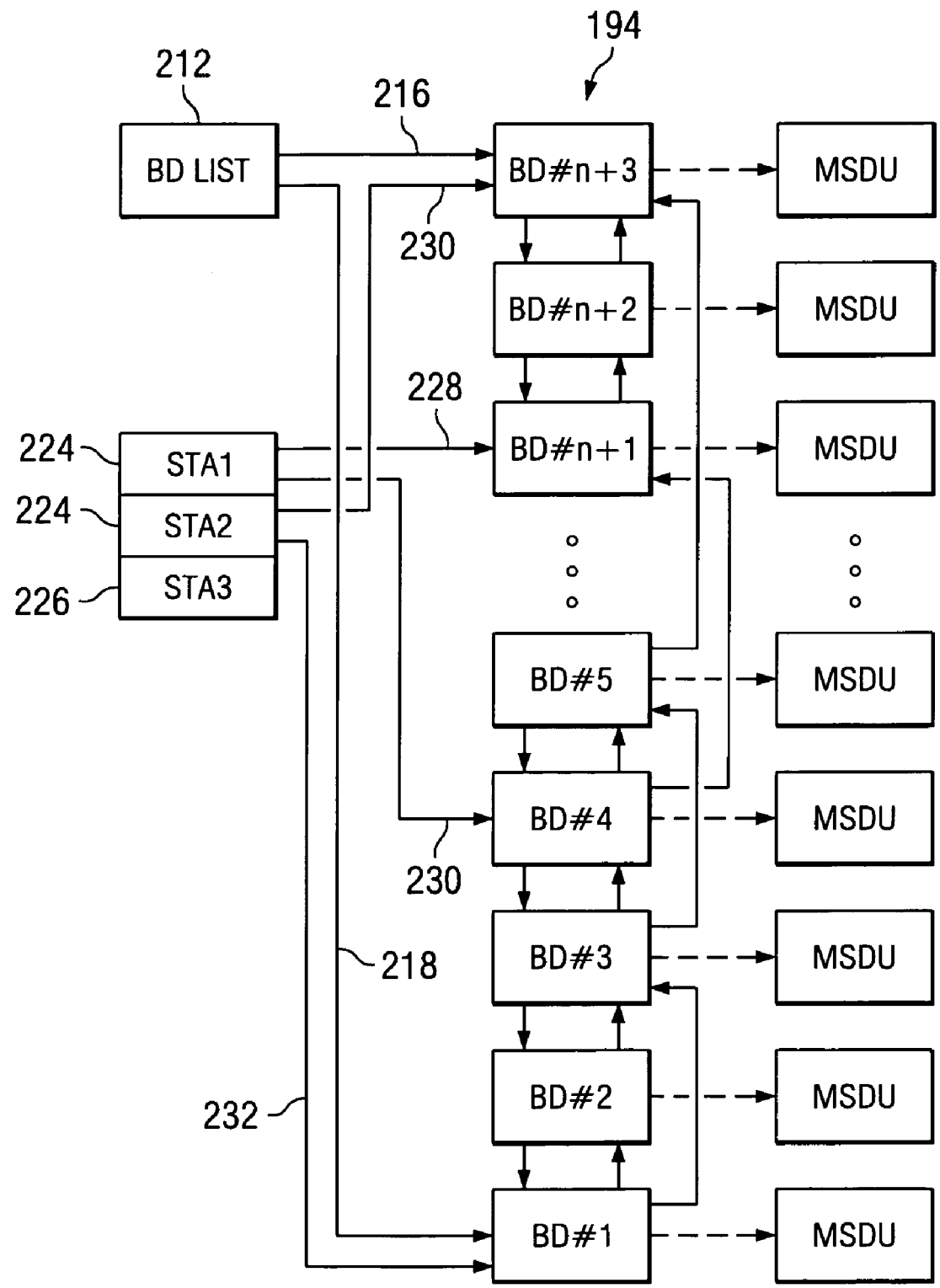
Figure 9C:
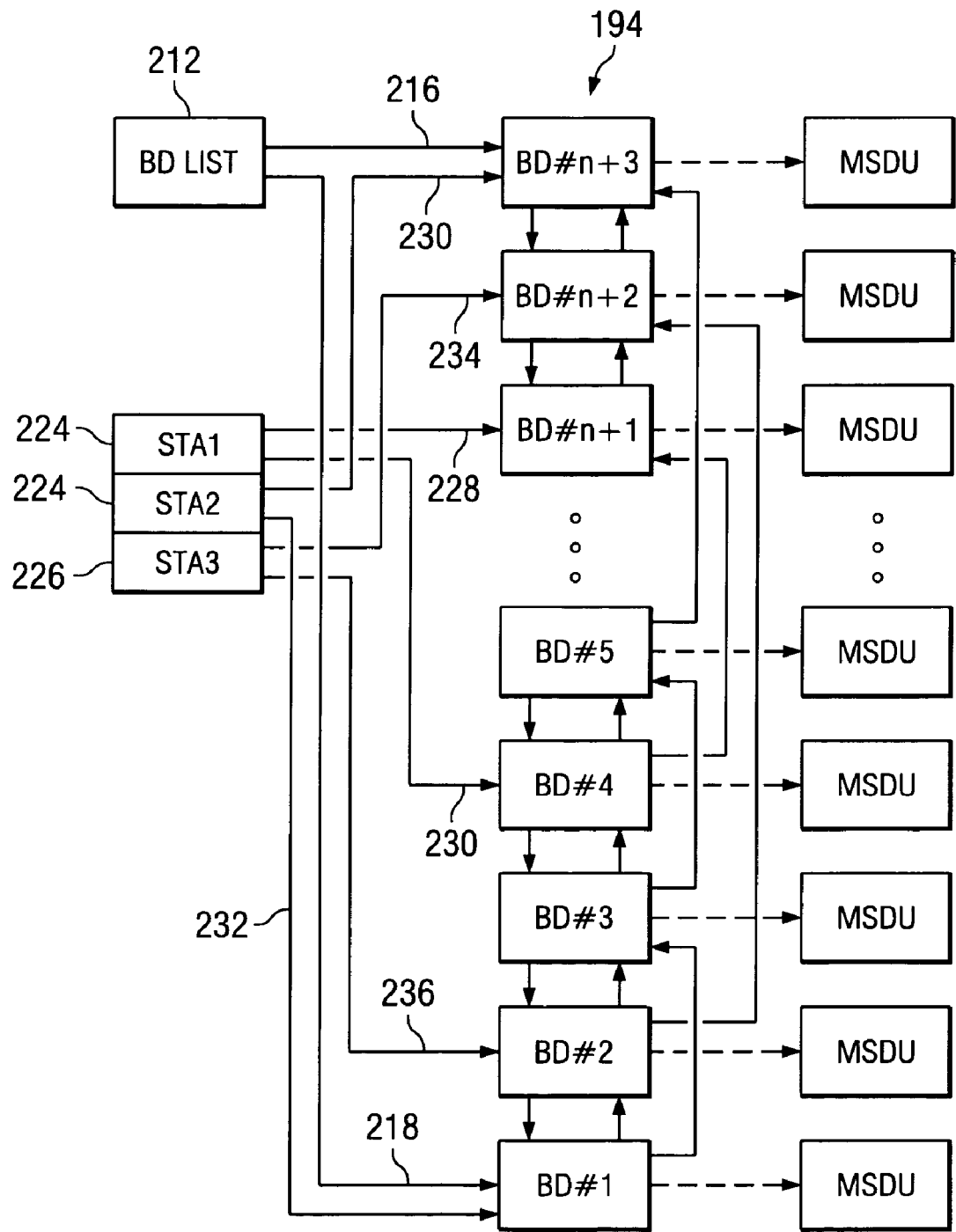

FIGS. 9A-9C illustrate how the Transmission Waiting Queue 194 structure must be changed to support 4X concatenation feature for multiple destinations. The 802.11 AP has to concatenate MPDUs according to the MPDU's destination and must also preserve the processing order of the MPDUs. The illustrated data structures supports these two requirements. The changes to the Transmission Waiting Queue 194 structure are (a) that the MPDUs transmitted to the same destination should be linked together in a linked list. The first 216 and last 218 pointers of each STA are kept in array. Each BD has a new pointer used to point on the next BD in the same "destination list," and (b) each BD has a pointer to its previous BD in the list, in order to allow polling of the BD from the middle of the list.

In FIGS. 9A-9C, three stations STA 1 (222), STA 2 (224) and STA 3 (226) are exemplary stations on an 802.11 WLAN. FIG. 9A shows Transmission Waiting Queue 194 structural changes related to the BD's destined for STA 1 to support 4X concatenation. First pointer 228 is directed to BD # n+1 in the queue and the last pointer 230 is directed to BD #4 in the queue. In FIG. 9B, the Transmission Waiting Queue 194 is changed such that, for BD's destined for STA 2, the first pointer 230 is directed to the head of the queue BD #n+3 and the last pointer 232 is directed to the end of the queue at BD #1. FIG. 9C illustrates that the changes to Transmission Waiting Queue 194 require for BD's destined for STA 3 to support 4X concatenation. The STA 3 first pointer 234 is directed to BD #n+2 and the last point 236 is directed to BD #2.

Figure 10A:
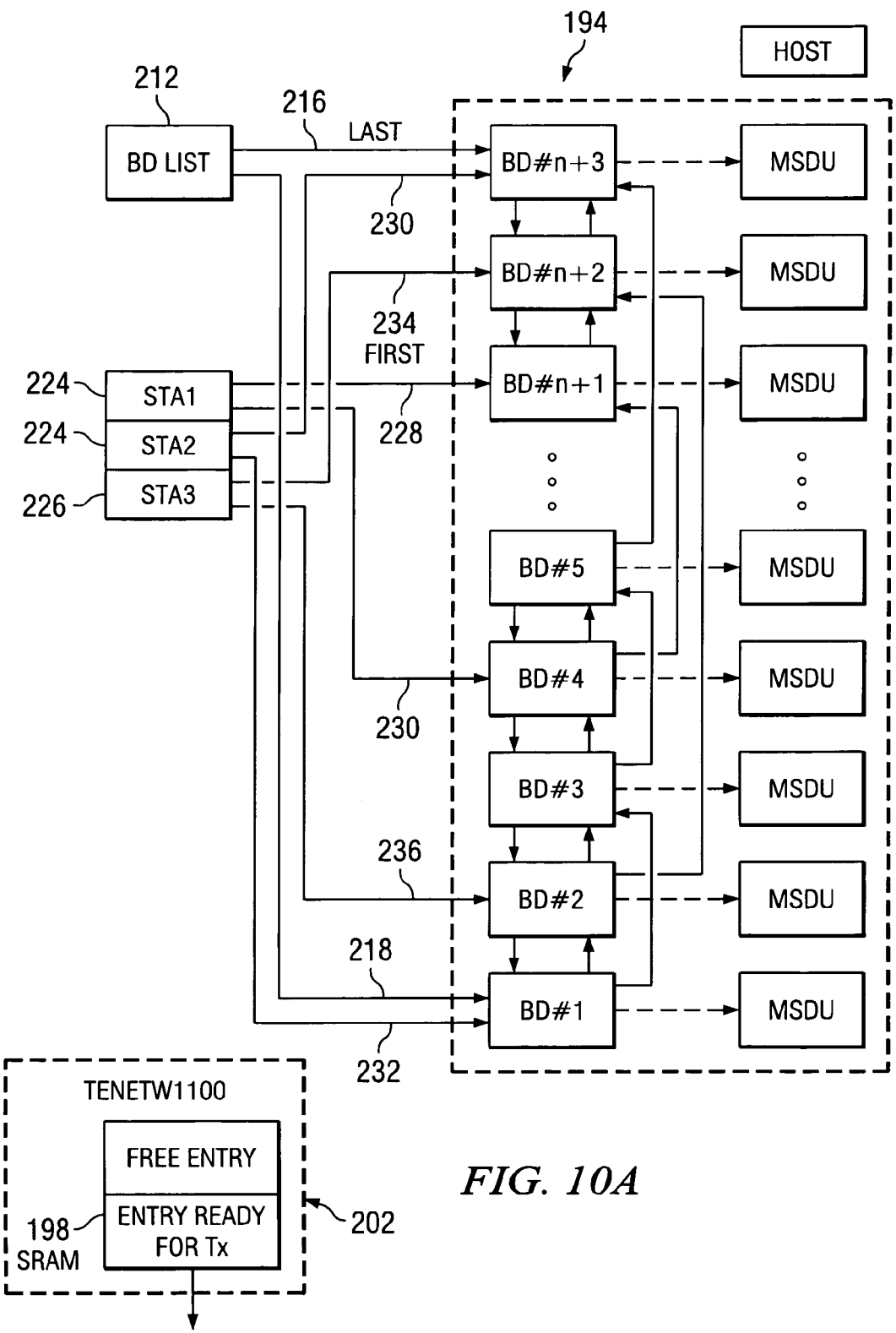
FIGS. 10A-10C illustrate preparing MSDUs for sending.
Figure 10B:
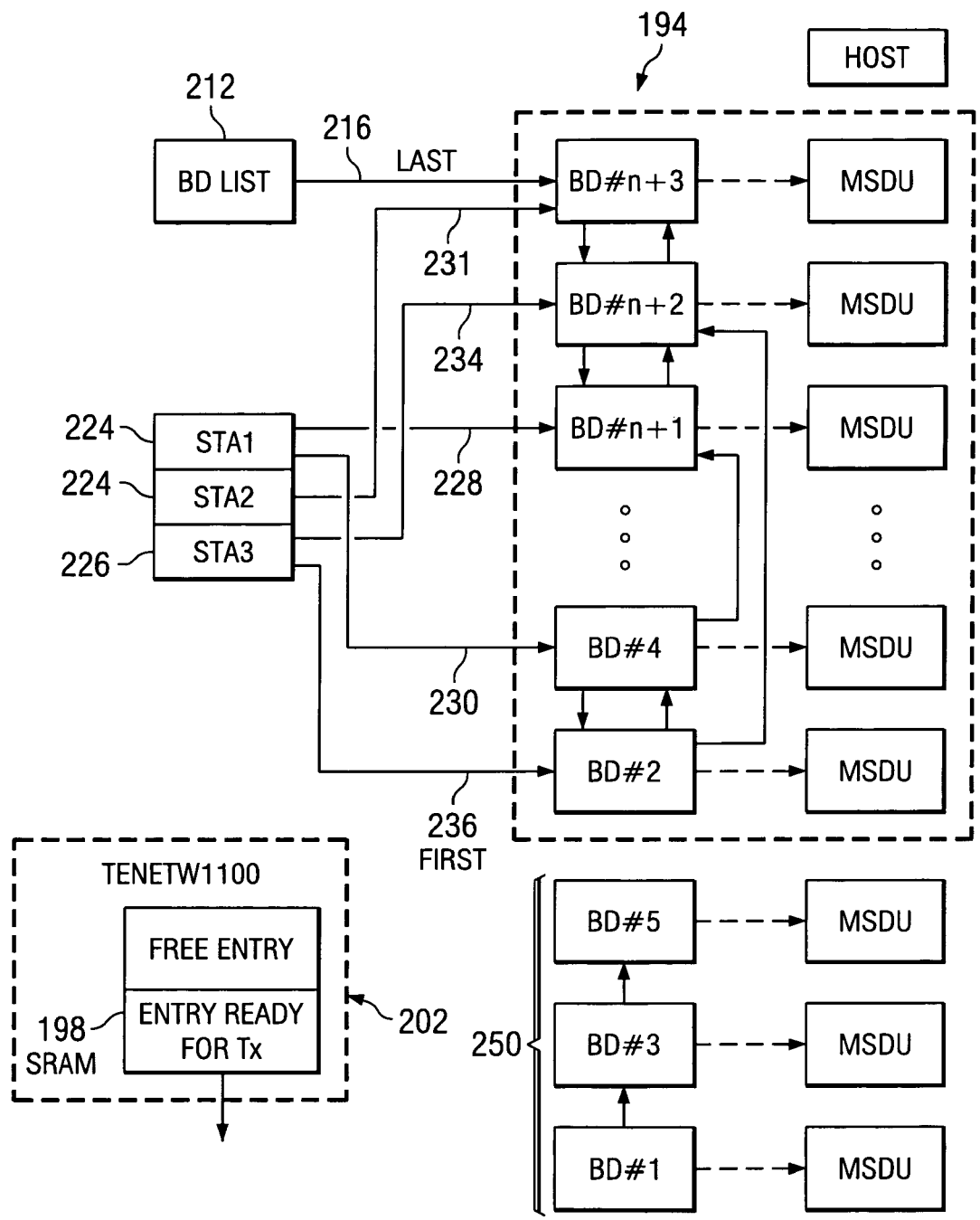
Figure 10C:
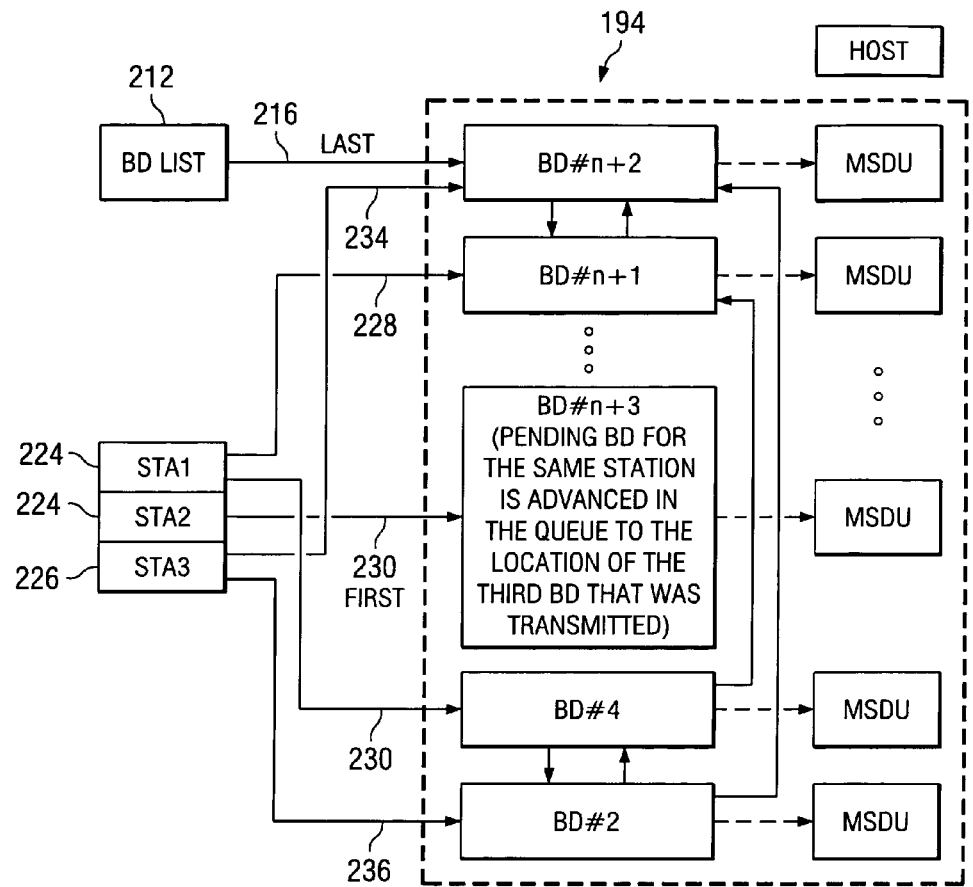

FIGS. 10A, 10B, and 10C illustrate the exemplary embodiment preparing three MSDU's for sending. FIG. 10A shows BD#1, BD#2, and BD#3 in the Host Transmission Waiting Queue 194 that are to be transmitted as one concatenated packet. Each STA has an array of pointers keeping the head and tail of BD's list for these stations. Further, each BD in the Transmission Waiting Queue 194 has additional pointers to the BD that is destined for each respective station as shown in FIG. 9C. Thus, the processing of the MSDU occurs and the queue links are updated according to the updating movements 238 of each BD as shown.

FIG. 10B illustrates BD#1, BD#3, and BD#5 that are unlinked from the Transmission Waiting Queue 194. The three MSDUs of these three BDs will construct one concatenated MPDU that will be moved to TNETW1100 transmission queue 198. FIG. 10C shows the Transmission Waiting Queue 194 after the last transmission in FIG. 10B. BDs #1, #3, and #5 are missing from the queue 194. When not all MSDUs for the same destination could be concatenated in one MPDU, the first remaining BD must be advanced to the location of the third concatenated BD. The advancing is performed in order to prevent the 4X traffic starvation and to guarantee a fair throughput for non-4X stations. In FIG. 10C, the pending BD for the same station is advanced in the queue 194 to the location of the third BD that was transmitted, as shown by BD #n+3 advancing for STA 2.

Figure 11:
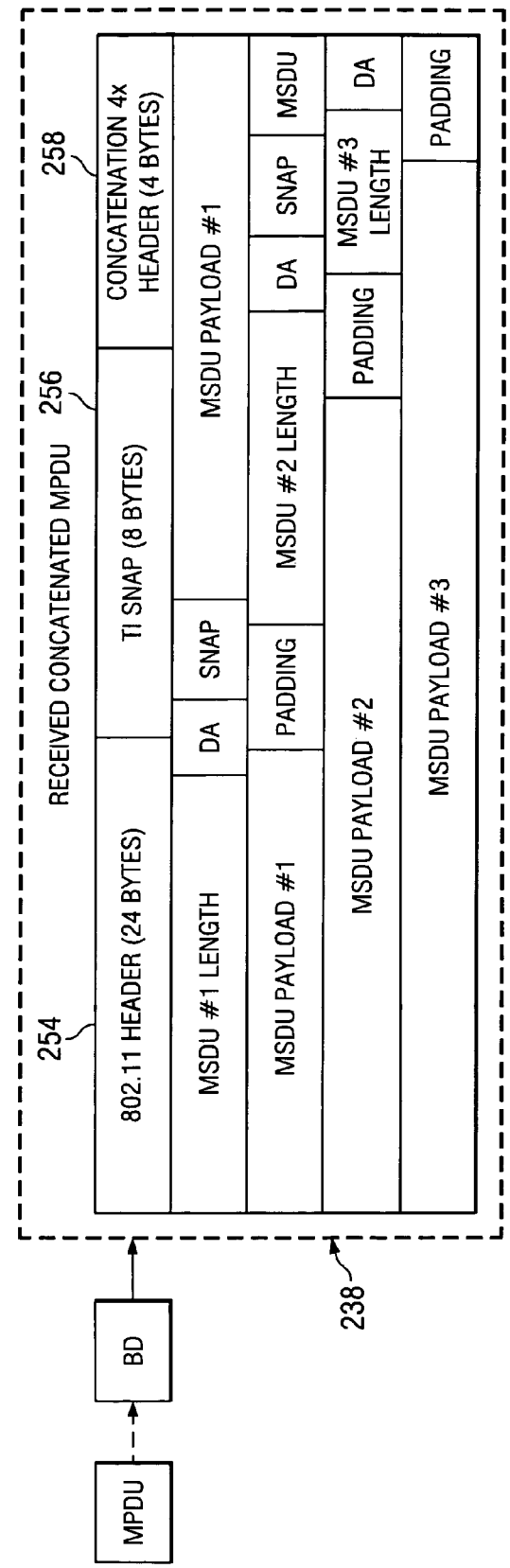
FIG. 11 illustrates a received concatenation MPDU.

Referring to FIG. 11, diagram 238 represents the format of a concatenated MPDU for three STAs that may be received. The MPDU includes an 802.11 header, TI SNAP field, concatenation 4X field, and the format for each MSDU #1, #2, and #3, as shown in FIG. 4A, running consecutively in the MDPU 238.

Figure 12:
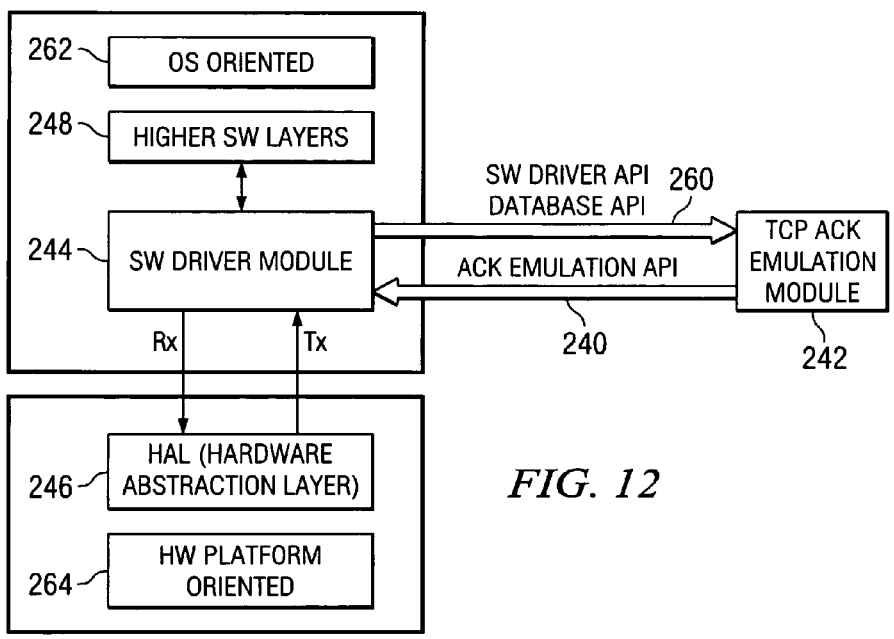
FIG. 12 illustrates acknowledgment emulation architecture.

FIG. 12 illustrates 4X Acknowledgment (ACK) Emulation architecture used in ACK Emulation by the preferred embodiment. The ACK emulation drastically improves data transfer throughput and significantly decreases overheads related to 802.11 data transmission. The 4X ACK emulation feature is designed and implemented as a separated software module. The module is independent of the OS and does not require any services from the OS. The minimal user API must be supplied in order to deploy the 4X ACK emulation feature in the specific system. The 4X ACK emulation module is non-reentrant for other SW modules in a system. FIG. 12 shows the API interface 240 between the 4X ACK emulation module 242 and the software driver 244. The 4X ACK emulation module 242 is a software module which implements 4X ACK emulation. The software driver module 244 is a software module for handling Receive/Transmit packets from the Hardware Abstraction Layer 246, inter-communicating with the 4X emulation module and also communicating with other software modules 248 in the system. The Hardware Abstraction Layer 246 is software that provides access routines for registers and SRAM of the TNETW1100 queue 198.

Figure 13:
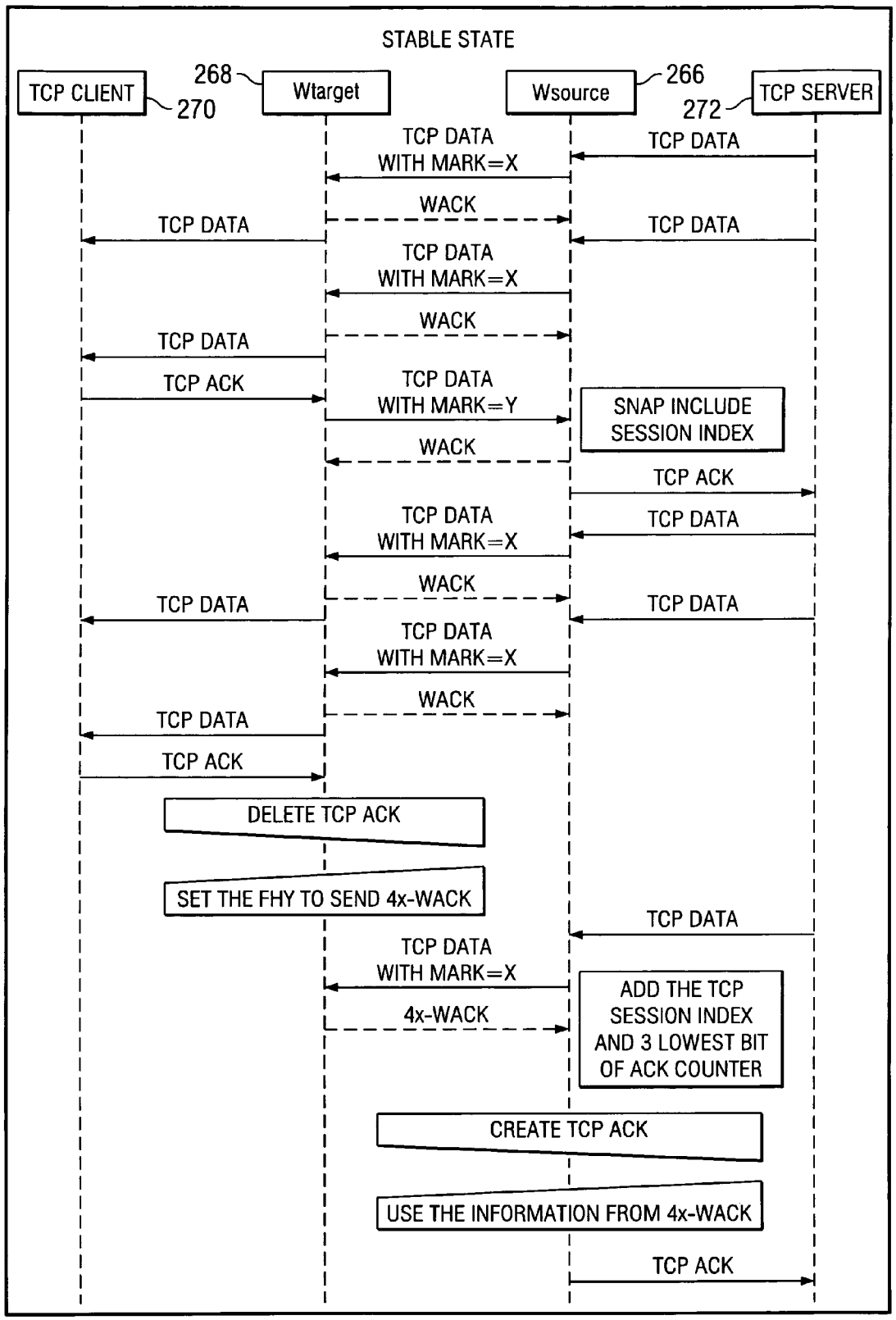
FIG. 13 illustrates the acknowledgment emulation steps.

The ACK Emulation algorithm is implemented in two segments of the WLAN network. These two segments are not necessary the sync and source of the data. FIG. 13 illustrates how the algorithm works on TCP/IP sessions. The WLAN paint that is closer to the actual data source will be designated WSource, while the 'WLAN point that is closer to the target will be marked Wtarget. The algorithm uses the 802.11 ACK messages to convey information on the reception of TCP/IP ACK messages instead of actually sending them over the WLAN section of the network. The information transferred using the 802.11 ACKS is marked as WACK in this document.

The algorithm is effective in cases where the WLAN segment of the network is the throughput bottleneck. One such example could be a WLAN AP router connecting to a PC through 100 Mbps Ethernet that is the data source and a WLAN station that resides in a PC that is the data target. The algorithm is self-sensing, and will verify that these preconditions are met before alternating the traffic.

The following definitions apply to FIGS. 14-17. ACK number specifies the next byte expected. Segment size is the size of data in a TCP data message. Ack counter is the ACK number div (Segment size*2). The Low counter is the three low bit in ACK number (Ack counter Mod $2^k$ k=2).

The Wsource transmission shown on FIG. 13 is performed with the following steps: 1. If number of packets in the queue to the Wtarget is larger then Non and Wtarget is capable of supporting the algorithm then turn X tag state to 'active'. 2. If number of packets in queue drops below Noff then turn X tag state to 'inactive'. 3. If turn X tag state is 'active' mark all outgoing concatenate packets with a tag X.

Figure 14:
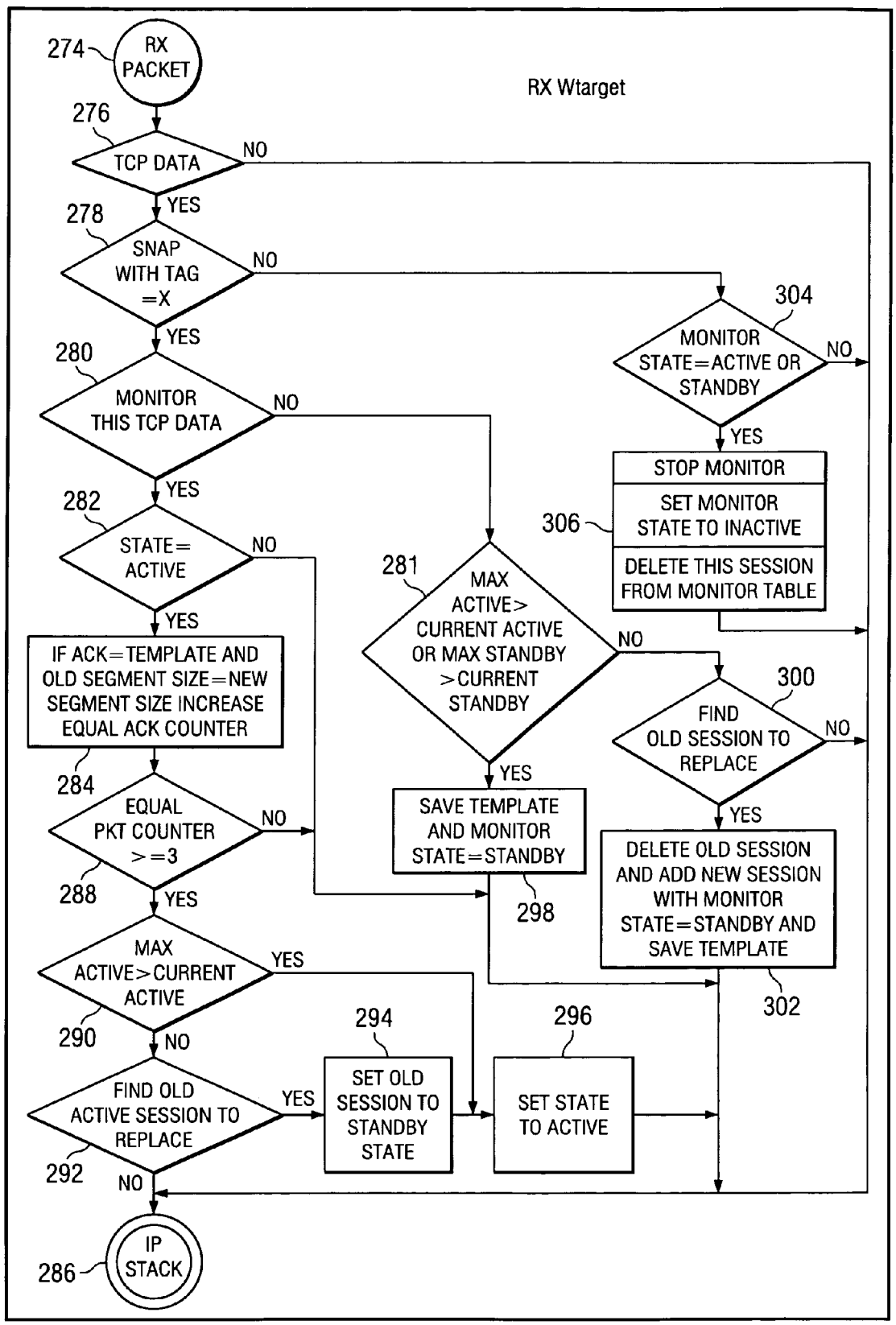
FIG. 14 illustrates the Wtarget receive flowchart.

The Wtarget receive, shown in the flowchart of FIG. 14, is performing the following steps:
1. If a data packet is marked with tag X, then perform the following:
  a. If monitor this data packet do:
    When 3 data packets with same Segment_size are for a session in 'standby' mode are spaced equally, then set the Segment_Size to this session to this spacing, and perform the following:
    i. Verify that number of 'Active' sessions is lower then Nactive. If true turn state to 'active' and assign a session number to it.
    ii. If false then verify that all the 'Active' sessions had transferred data in the last 10 msec. If false, then turn the session with the oldest last packet to 'standby' and set the 'active' state for the current session use the session number of the session that was turned to 'standby' for this session.
  b. If not monitor this data packet
    i. Verify that number of 'Active' or 'Standby' sessions is lower then Nmonitor. If true turn state to 'standby' add the session to the monitored list and start monitoring this TCP/IP session ACK packets ACK sequence numbers and data packets sequence numbers.
    ii. If false then verify that all the 'Active' & 'Standby' sessions had transferred data in the last 10 msec. If false, then turn the session with the oldest last packet to 'inactive' and remove it from the monitored list. set the 'standby' state for the current session and add it to the monitored list.

If the data packets from an 'active' or 'standby' session are received without tag X then turn state to 'inactive' and erase it from the monitored list.

Figure 15:
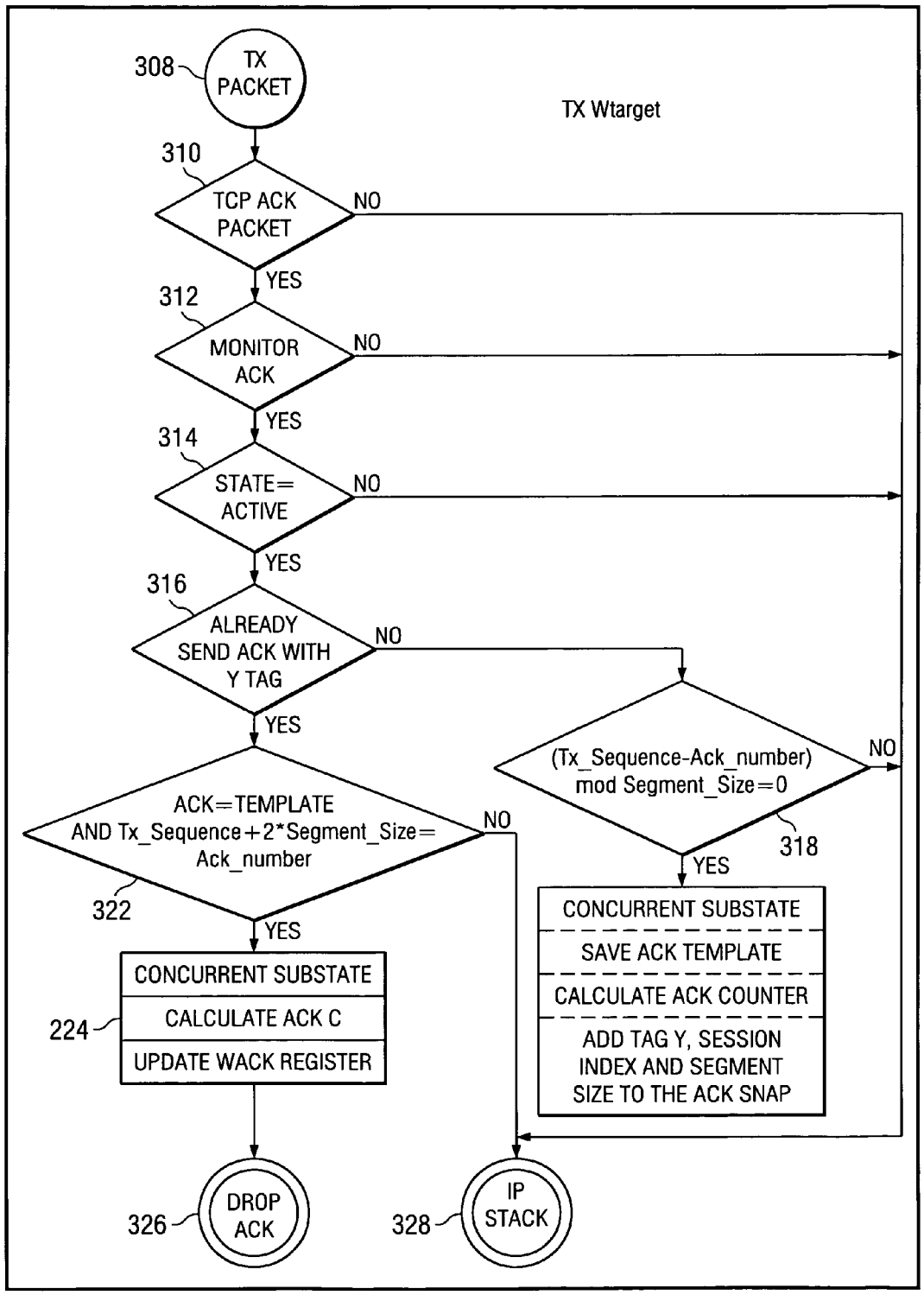
FIG. 15 illustrates the Wtarget transmission flowchart.

The Wtarget Transmission, shown in the flowchart of FIG. 15, is performed with the following steps:
1. If the new packet session is 'Active' and didn't send Y tag perform the following:
  store the packets as a template, add tag Y to ACK packets for this session the tag will include a session number that will be used to distinguish the session in WACK messages as well as the Segment_Size.
2. For an 'active' session that already send Y tag verify for each incoming TCP/IP ACK the following:
  a. ACK number equal to previous ACK_number+ 2*Segment_Size b. All other fields (the IP identification excluded) are identical to the ACK template
If true then do not send this ACK packet.
For all ACKs update Ack number with the received Ack-number, Ack Counter as follows:

Ack Counter=Ack number div (Segment Size*2)

After reception of data packets use the WACK channel to send the information on Ack_counter and Session index. The Ack_counter data sent is coded as follows:

Low counter=Ack counter mod $2^k$ (k=3)

For cases where multiple streams are active. The WACK channel will send the information on each one of the Low counter of all the active streams. Each WACK message carries information on one of the active stream Low counter. The order of sending is fixed.

Figure 16:
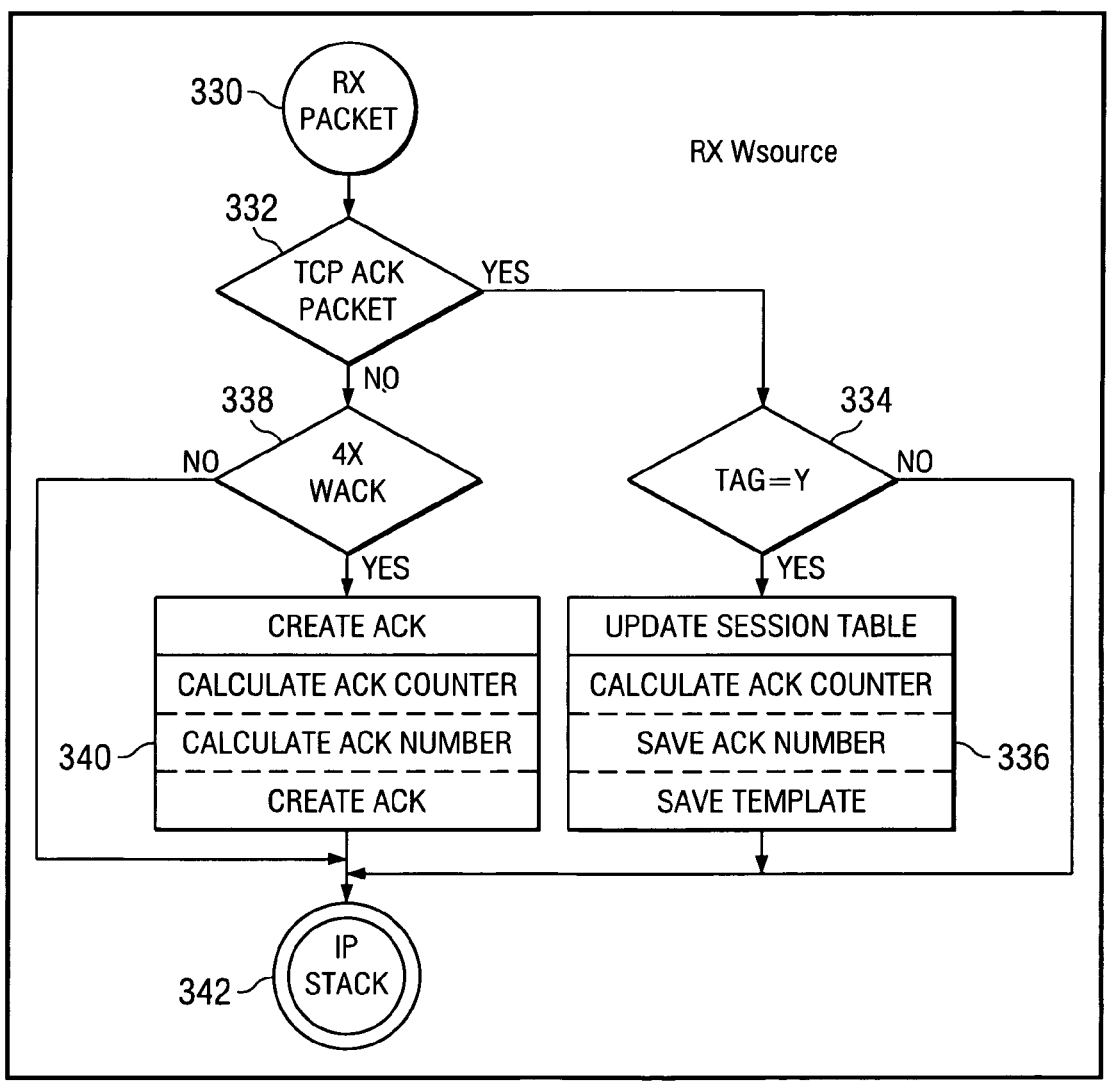
FIG. 16 illustrates the Wsource transmission flowchart.

The Wsource Receiving, illustrated in the flow chart of FIG. 16, is performed with the following steps:
1. If ACK packet from is received with tag Y create a record for this session and turn state to 'active'. The tag will also include the session number for this session to be used in future WACK transmissions for this session as well as the Segment_Size. Store this packet as a template for the regenerated ACKs for this session. Calculate the Sequence number as follows:

ACK counter=ACK number div (Segment Size*2)

On the reception of a WACK calculate Rx ACK counter as follows:

ACK counter=(Low_Counter−(ACK_counter mod $2^k$)+$2^k$) mod $2^k$+ACK counter

If ACK counter has been incremented by W ACK messages then calculate the ACK number as follows:

ACK number=ACK number mod (Segment Size*2)+
RxAckcount*(Segment Size*2)

If the Sequence number is larger then the last sent sequence number for this session. then create a TCP/IP ACK packet with this sequence number. The other fields are taken from the stored template. For the IP identification field use a counter that is incremented on every emulated ACK packet.

The preferred embodiment implements a zero collision method that enables a WLAN to achieve a collision free implementation by usage of different Contention Window (CW) values for different ST/IAP in a BSS. The 802.11 MAC protocol is based on the usage of randomly selected back off values from predefined contention windows. The system is designed to offer fair access to all the stations and uses no coordination between them. The protocol does not eliminate collisions entirely even for systems that include only 2 stations. The rate of collisions is related to the number of stations attempting to transmit simultaneously. The exemplary embodiment ensures zero collisions under normal reception conditions between all the stations that implement it. It will provide similar collision rate and access opportunities to legacy equipment on the same system. The elimination of collisions will increase network bandwidth and can facilitate even larger bandwidth gains by reduction of the backoff windows in the systems (CWmin) on the expanse of 'fair access' to legacy devices.

The method for zero collisions is as follows: Let n be the number of stations in a BSS Let CW be the minimal contention window used in the system Let DIFS be the minimal inter frame spacing. Let SLOT be the slot size :or back off calculation. For standard 802.11 stations the back off value is calculated as follows: Bo=DIFS+Rand(0:CW−1)*SLOT. The exemplary embodiment includes assigning an ID to all stations in a BSS. In an Infrastructure network this number can be assigned by the AP to each station that joins the BSS. All stations need to know is the current number of stations on the network (n). This information can be reported as part of a proprietary IE in Beacon frames or as a separate broadcast message. The ID is an integer number between 0 to n-1.

For the stations that implement the following scheme the values of CW. DIFS & SLOT are modified as follows:

SLOT'=SLOT*$n$

CW'=round(CW/$n$)

DIFS'=DIFS−ID*SLOT

The result is that all the station that implement this scheme have no collisions between them as they will always use different slots for transmission. A station that implements the original scheme may collide with the modified stations, but the collision rate is identical to original collision rate. The exemplary embodiment is applicable for cases where the number of stations in a BSS is relatively low. In specific it can not be used if the number of stations is higher then CW.

This method also creates some preference in access to the stations that get lower ID values. The bias in access is equal at most to 1/CW'. For cases where CW is high (32) and n relatively low (2-4) this bias is insignificant. The bias can be fixed by using a method of rotating priorities. One possible implementation would be to use a counter in the beacon frames to offset the ID using DIFS'=DIFS+((ID+Beacon-Count)mod n)*SLOT.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed is:

1. A method for wireless local area network throughput enhancement, the method comprising:
   providing an access point in a wireless computer network transmitting data packets over radio frequency signals;
   providing an endpoint station, receiving said data packets, in a wireless computer network;
   emulating an acknowledgment signal transmitted between said access point and said station by
      compressing information conveyed in TCP/IP packets,
      appending said information to said data packets for transmission,
      extracting said information after reception of said data packets, and
      recreating said acknowledgment signal from said extracted information;
   reordering said data packets into a megapacket in said access point using concatenation of said data packets; and
   transmitting said megapacket to said station.

2. The method of claim 1, wherein the concatenation comprises concatenating multiple MPDUs in a single 802.11 packet.

3. The method of claim 1, wherein the concatenation comprises 4x concatenation.

4. The method of claim 1, wherein the method is performed when the wireless local area network is in an ad-hoc mode.

5. The method of claim 1, wherein the method is performed when the wireless local area network is in an infrastructure mode.

6. The method of claim 1, wherein the method is performed in an 802.11 environment.

7. The method of claim 1, wherein the emulating is implemented in a software module independent of the operating system.

8. The method of claim 1, wherein the emulating is performed in accordance with an emulation algorithm.

9. The method of claim 8, wherein the emulation algorithm is implemented in two segments of the wireless local area network.

10. The method of claim 9, wherein the two segments are not in synchronization.

11. The method of claim 8, wherein the emulation algorithm is activated based upon a determination that the wireless local area network is a throughput bottleneck.

12. The method of claim 1, wherein the reordering is activated when another station on the wireless network transmits an information element in association with a request.

13. The method of claim 12, wherein the information element is transported in a robust security information element.

* * * * *